June 5, 1951

E. B. DEWEY 2,556,072

PLANTER

Filed Sept. 29, 1948

E. B. DEWEY 2,556,072

PLANTER

Filed Sept. 29, 1948

Inventor
Edward Bradley Dewey
By
ATTORNEYS

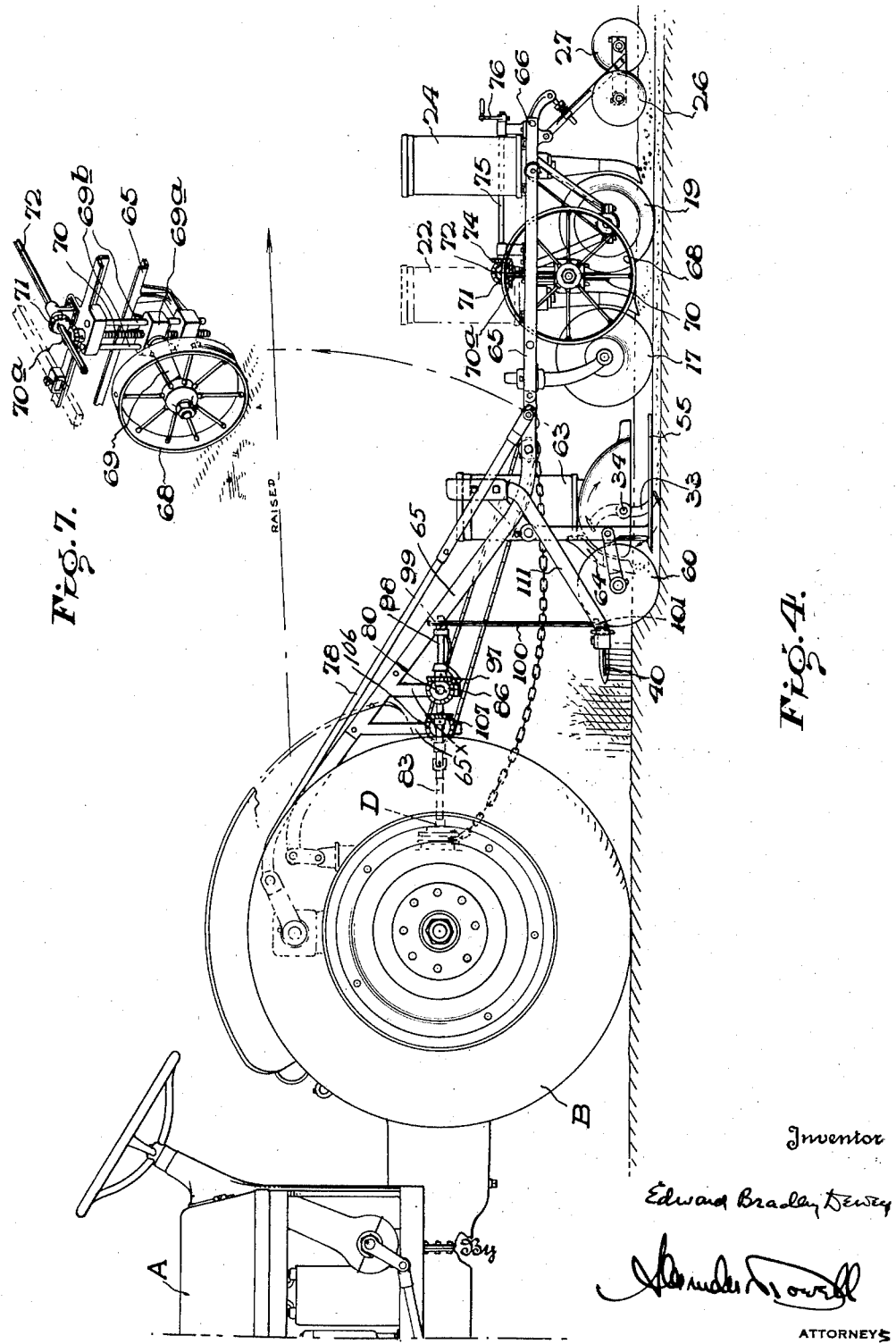

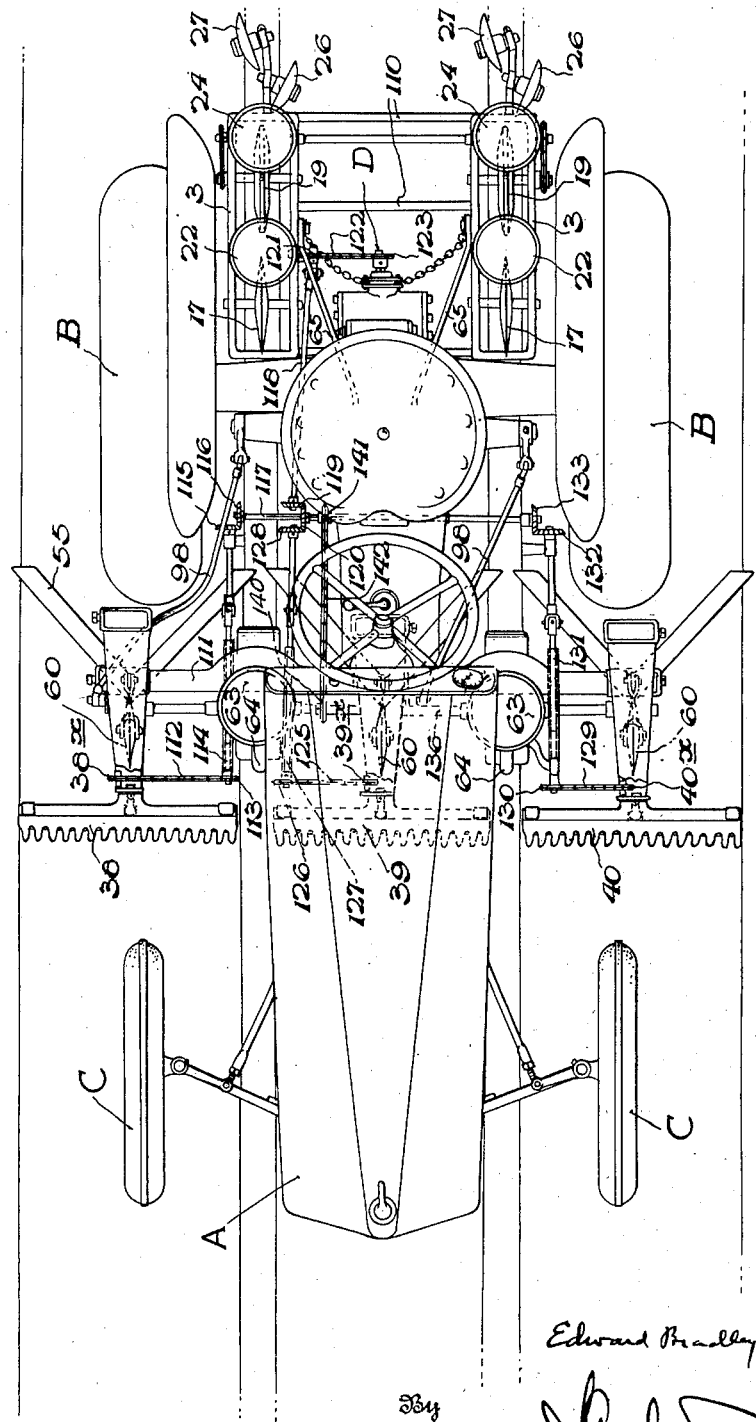

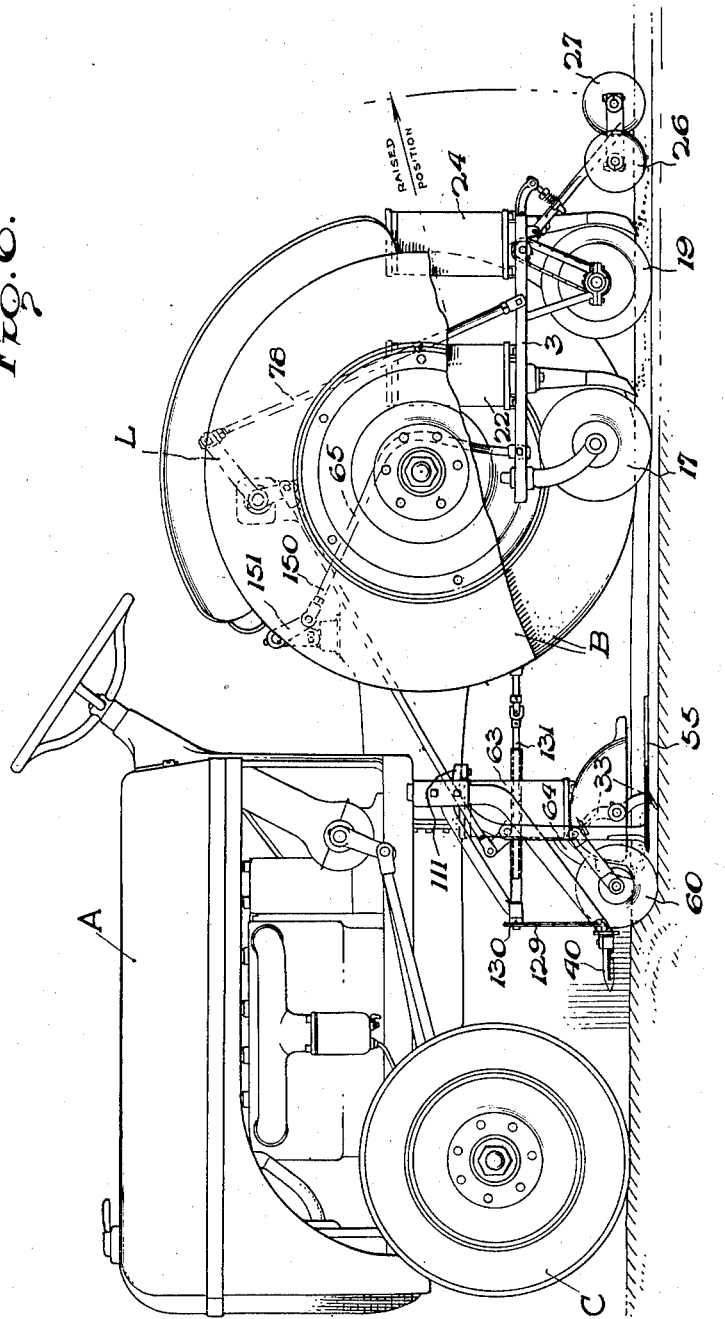

Patented June 5, 1951

2,556,072

UNITED STATES PATENT OFFICE 2,556,072

PLANTER

Edward Bradley Dewey, Washington, D. C.

Application September 29, 1948, Serial No. 51,671

15 Claims. (Cl. 111—1)

This invention is a novel planting machine adapted to be used for planting crops, particularly through trash mulch or green manure, same being an improvement upon my copending applications Serial No. 521,673, filed February 9, 1944, and Serial No. 550,264, filed August 19, 1944, now abandoned.

Agricultural land, amounting to little more than an acre per person throughout the world and two and a half acres in the United States, is shrinking fast as populations rise, and the land eroding away each year is producing less food. It is the land that produces the harvest and not the farmer, and the farmer should use every method to keep his acreage on a sustained productive capacity, giving him a balanced economy. Man with the ax, fire, grazing animals and the plow, has done much to decrease plant cover and breaking of the hydrologic cycle affecting the amount of water that the earth absorbs to replenish its water table.

The natural principles of land use are divided into three general classes:

I. Suitable for cultivation.

II. Suitable for permanent pasture, range or woodland.

III. Suitable for wildlife or recreation.

The U. S. Soil Conservation Service has done a great deal towards the control of soil erosion by reforestation, controlled grazing, and improved farming methods. These include the conventional crop rotations, fallowing, fertilization, contouring, strip cropping, terracing and stubble mulch farming (Farmer's Bulletin #1997 of Soil Conservation of Agriculture Department).

The uncontrolled raindrop is an enemy for when it falls upon the top soil, uncontrolled, the environmental resistance rises so high that it almost cancels out the biotic potential. In other words, if the top soil is prepared to absorb water, the raindrop is necessary and welcome, otherwise it becomes the companion of soil erosion.

The U. S. Soil Conservation Service in proven tests has shown that grass or a mulch covering will successfully stop raindrop erosion. Since row crops, such as corn, cotton and soybeans, etc. increase erosion as much as a thousand times over normal erosion where the ground is protected by grass, it would seem obvious that clean tillage must give way to some sort of cultivation that will leave enough plant coverage or mulch between the rows to hold the soil in place.

The erosion of row crops planted in class I (see ante) soil suitable for cultivation can be stopped and the humus of the soil built up by the planting of a cover crop of a mixture of legumes and grasses suitable to that section of the country; and by the use of special planting machinery, using this cover crop as a living or dead mulch as the moisture and conditions of that section will designate. This, together with the other erosion controls and suitable land use as recommended by the U. S. Soil Conservation Service, would successfully control all erosion in this country.

My invention is a novel planting machine, adapted by the making of certain adjustments to plant row crops, both field and truck, through three different kinds of cover crop or mulch, as follows:

I. Through a stubble or trash mulch.

II. Through a living cover crop and mulch and the control of its growth.

III. Through a dead cover crop and mulch.

In all these operations, the preparing of the seed bed and planting consists of a single operation and requires no further cultivation except in the control of the living mulch.

I. The operation in planting through a stubble or trash mulch is to open the furrow with the rolling coulter, widen the furrow, drop in the seeds and cover them.

II. The operation in planting through a living cover crop and mulch would be first to mow or cut the growing cover crop, leaving the cuttings on the ground as a mulch, then with a rotary tiller or by other means pulverize the cover crop and mulch in a narrow strip (about six inches wide directly in front of the planting mechanism) as a seed bed. The rolling coulter of the planter will cut through any trash remaining and start the furrow, the widening V-shaped wheel will open the furrow and give a firm bed for the seed which are now dropped and covered. This completes the planting except for one or two mowings or cuttings of the cover crop between rows while the row crop is growing.

III. The operation in planting through a dead cover crop and mulch would be first to mow or cut the growing cover crop, leaving the cuttings on the ground as a mulch, then with a roto-tiller, or other means, pulverize the cover crop and mulch in a narrow strip (about six inches wide directly in front of the planting mechanism) as a seed bed. Then with a subsurface tiller, or by other means, cut the roots of the cover crop between the pulverized seed beds, thus leaving a non-growing or dead mulch between the row crops. The rolling coulter of the planter will cut through any trash remaining and start the furrow, the widening V-shaped wheel will open the furrow and give a firm bed for the seed which are now dropped and covered. This completes the planting as no further cultivation is necessary.

The object of the present invention is to provide a planter of the type shown in my aforesaid co-pending applications, involving parallel units each consisting of a circular cutting disc to first cut through the surface brush and open a furrow in the surface of the ground, the disc being followed by a wedge-shaped wheel following in the cut made by the cutting disc, which wheel widens and compresses the said cut forming a trench to receive the seed, this wheel acting moreover as a pressure roller.

Other minor objects of the invention will be hereinafter set forth.

I will explain the invention with reference to the accompanying drawings which illustrate several practical embodiments thereof to enable others familiar with the art to adopt and use the same; and will summarize in the claims, the novel features of construction, and novel combinations of parts, for which protection is desired.

In said drawings:

Fig. 4 is a side elevation of the modification shown in Fig. 3.

Fig. 5 is a top plan view of a further modified arrangement.

Fig. 6 is a side elevation of the modification shown in Fig. 5.

Fig. 7 is a perspective detail view.

Figure 1:
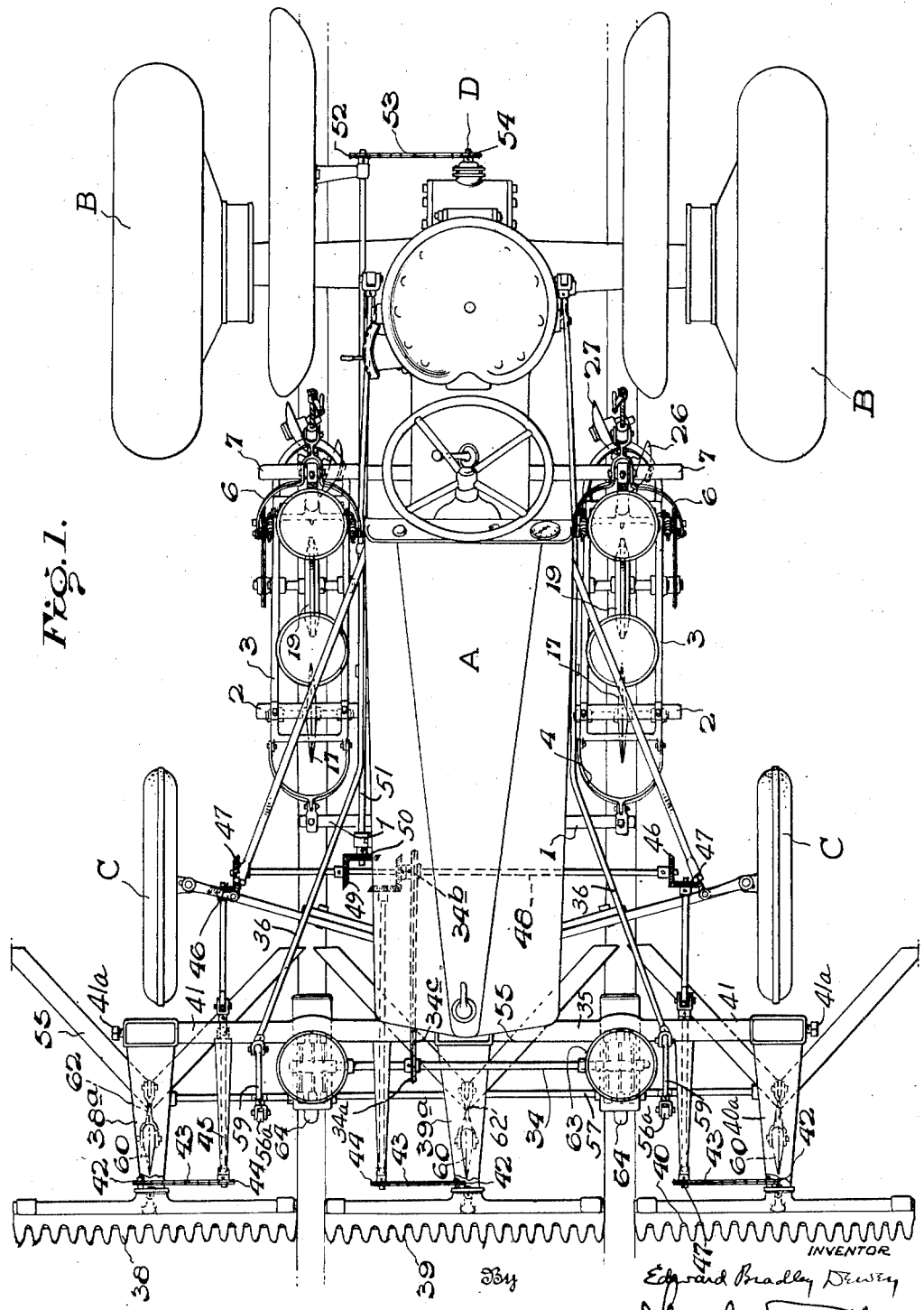
Figure 1 is a top plan view of one form of my novel planter showing the parts carried by a tractor.
Figure 2:
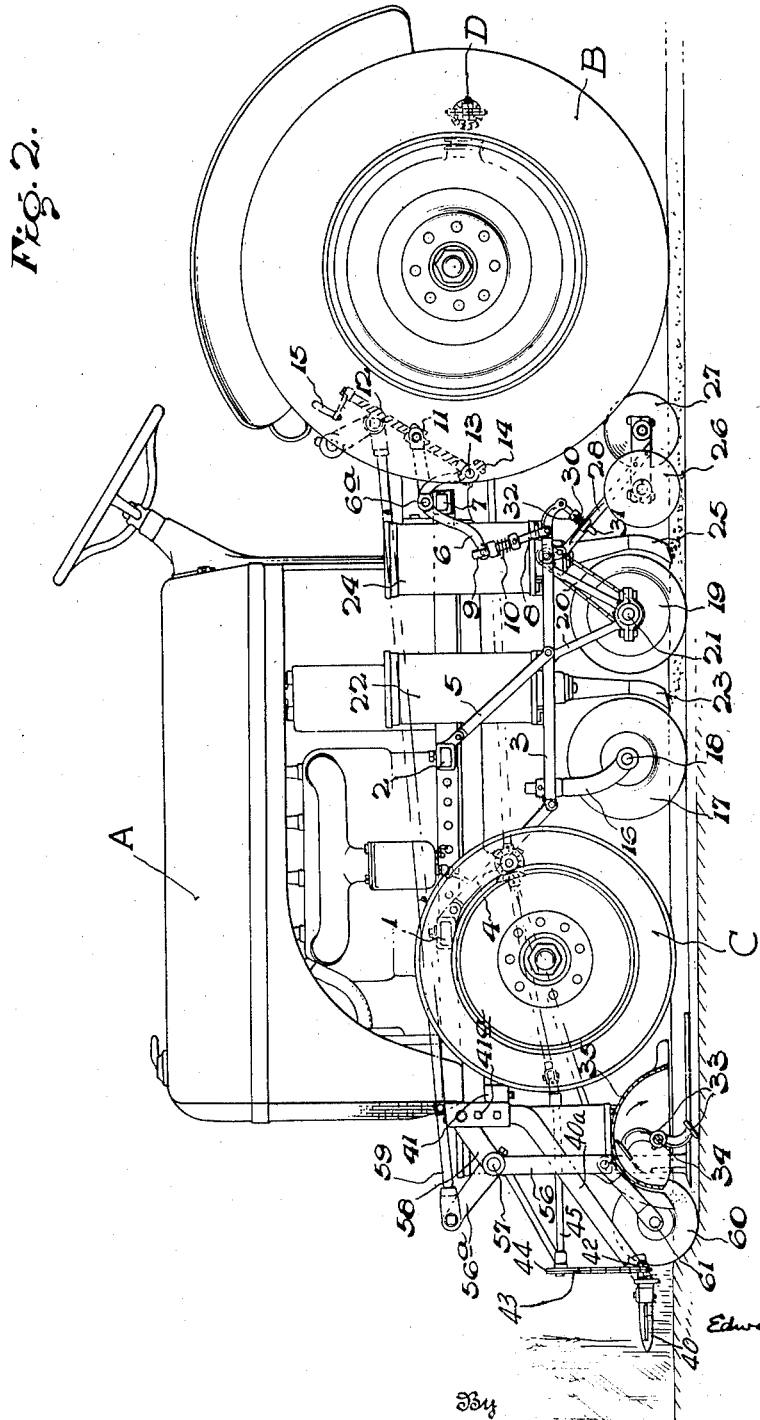
Fig. 2 is a side elevation thereof.

As shown in Figs. 1 and 2, the tractor A is supported by rear drive wheels B, and front steering wheels C, the tractor having a power takeoff shaft D at its rear end, the construction of the tractor per se forming no part of my present invention.

In this modification spaced parallel cross struts 1 and 2 extend from each side of the tractor chassis, said struts supporting the planter frames 3 at opposite sides of the tractor. Adjustable straps permit the frames 3 to be shifted laterally of the axis of the tractor. Frames 3 are supported and drawn or pulled by front yokes 4 pivotally connected to the front end of the frame 3 and to the straps on the forward struts 1. Other yokes 5 are pivotally connected to the frames 3 adjacent their centers and also to adjustable straps carried by the struts 2, the yokes 4 and 5 thus acting as parallel links vertically supporting the front portion of the frame 3.

The rear portion of each frame 3 is supported by a lever 6 pivotally mounted as at 6a upon a rear strut 7, the portion of the lever 6 forward of pivot 6a being bifurcated with its outer end substantially overlying the sides of the frame 3 at its rear end. Pivotally connected at the sides of the frame 3 are bolts 8 (Fig. 2) which pass upwardly through eyes in the outer ends of the bifurcations of lever 6 and are secured thereto by means of pivot pins 9, thereby connecting the bifurcations of lever 6 to the opposite sides of the frame 3. Springs 10 are provided on bolts 8 interposed between the under sides of the bifurcations of lever 6 and adjustable collars on the bolts 8 to take up any play between the parts while permitting a slight side sway of the frame 3 with respect to the pivot of the lever 6.

The upper end of lever 6 carries a pivoted nut 11 through which a screw shaft 12 passes, the lower end of shaft 12 having a ball head 13 received in a fixed ball socket 14; and the upper end of shaft 12 carries a hand crank 15, whereby as shaft 12 is rotated the nut 11 will move axially thereof and thereby pivot the lever 6 on pivot 6a. Thus, by manipulating each handle 15, each entire frame 3 may be raised or lowered with respect to the ground surface while the frame 3 is always maintained by yokes 4 and 5 substantially horizontal, the adjustment of screw shaft 12 serving to raise the entire planting unit above the ground surface for convenience when turning the tractor A around at the end of a furrow, or for convenience of transportation. The above described frames 3 and their supporting means are similar to those shown in my aforementioned applications.

From the under side of each frame 3 at the front end thereof is a yoke 16 which is pivoted at its upper end to the frame 3, said yoke carrying a circular coulter disc 17 journaled on an axle 18, the coulter thus having a caster action. In rear of the coulter 17 and in axial alignment therewith is a trench widening and compressing wheel 19, supported in opposed brackets 20 mounted on the under side of the frame 3 and carrying an axle 21 for the wheel 19, as described in my aforementioned applications. On the upper side of each frame 3 is a fertilizer hopper 22 having a valve which discharges fertilizer into a boot 23 disposed immediately in the rear of the coulter disc 17 (Fig. 2) and similarly mounted upon the top of frame 3 is a seed hopper 24 (Fig. 2) having a valve which discharges into a boot 25 disposed immediately in rear of the trench widening and compressing wheel 19. At the rear of the trench widening and compressing wheel 19 and the boot 15 are a pair of oppositely facing concavo-convex discs 26 and 27 which are carried by inclined frames 28, said discs being toed-in towards the wheel 19 and being adapted to fill in the seeded trench with a loose mulch, thereby completing the planting operation. As shown, each inclined frame 28 is depressed by means of a spring 30 (Fig. 2) disposed around a bolt 31 which is carried by the bolt 8, the spring 30 being interposed between the upper side of the frame 28 and a nut 32 on bolt 31, as shown, the adjustment of nut 32 varying the downward pressure of spring 30 on the inclined frame 28.

The above arrangement of the coulter disc 17, trench widening and deepening wheel 19, and the concave or convex discs 26—27, together with the fertilizer and seed hoppers and boots is in all respects similar to that disclosed in my aforesaid applications, and therefore needs no further detailed description herein.

My present invention includes the provision of a rotary tiller in advance of and in axial alignment with each coulter disc 17 and trench widening wheel 19. As shown in Figs. 1 and 2, each rotary tiller 33 is mounted on a horizontal shaft 34 and is power driven from the power takeoff shaft D of the tractor in a manner hereinafter described. A hood 35 is preferably provided over each rotary tiller 33 in order to confine any dust or flying dirt caused by the rapid rotation of the rotary tiller as the machine moves across the ground, the rotary tiller serving in the customary manner to thoroughly dig up the ground and kill all growing plants in its path, thus preparing the seedbed, the planting unit immediately following thereafter.

Shaft 34 is carried in bearings at the outer ends of struts 36 extending from each side of the tractor, the vertical adjustment of the shaft 34 being accomplished in any desired manner.

If desired, additional fertilized hoppers 63 may be provided directly above the rotary tillers 33 with boots 64 discharging in front of the rotary tillers 33 so that as the rotary tillers act they mix the fertilizer thoroughly in the prepared seedbed.

The space between the tilled rows may be mowed by means of mowing attachments which, as shown, comprise spaced parallel mowing units, three being shown, i. e., 38—39—40 which are formed integrally with brackets 38a—39a—40a having their inner ends vertically and adjustably mounted on a cross-beam 41 secured across the front end of tractor A, as shown in Figs. 1 and 2, the vertical adjustment of the mowers being effected by manipulating screws 41a which extend through sockets for the upper ends of the brackets 38a—39a—40a respectively of the mowing attachments. The blade of each mowing attachment is reciprocated in its toothed guard to effect the cutting operation by power from the power takeoff shaft D of the tractor. The particular type of mower is well known in the art and needs no detailed description herein except to state that the driving sprocket for actuating the reciprocating blade for each of the mowing attachments 39—39—40 is numbered 42 and carries an eccentric pin engaging a slotted yoke carried by the blade.

Each sprocket 42 is driven by a chain 43 from a sprocket 44 on a shaft 45 carrying at its inner end a bevel gear 46 meshing with a bevel gear 47 on a shaft 48 extending transversely of the tractor, shaft 48 having a bevel gear 49 meshing with a bevel gear 50 on a shaft 51 extending rearwardly to a point opposite the power takeoff shaft D, shaft 51 carrying a sprocket 52 around which runs a chain 53, which chain also runs around a sprocket 54 on the power takeoff shaft D. Obviously, any other convenient means for reciprocating the blades of the mowers may be utilized, the means shown in the drawings merely being illustrative.

The shaft 34 of the rotary tillers 33 carries a sprocket 34a opposite a sprocket 34b on the shaft 48, and a chain 34c runs around sprockets 34a and 34b to rotate shaft 34 at a desired tilling speed.

As shown in Fig. 1, the spacing between the mowing attachments 38—39—40 is substantially equal to the width of the rotary tillers 33 so that, as the tractor is moved along the ground the space between the planted rows may be cut or mowed to any desired height. Means may be provided for shifting the outer mowing attachments 38 and 40 laterally with respect to the intermediate attachment 39, for adjustment of the spacings between the attachments.

In connection with the mowing attachments 38—93—40, I provide subsurface tillers 55 which are V-shaped in the usual manner and are connected at their vertices upon the lower ends of uprights 56 (Fig. 2) which are pivotally mounted as at 57 on pivoted links 58 which are mounted on the cross-beam 41, so that when the upper offset ends 56a of the uprights 56 are pulled inwardly by manipulating pull rod 59 (Fig. 2), the uprights 56 will be simultaneously lifted vertically to bring the blades of the subsurface tillers 55 above the ground surface.

In order to open the ground in advance of the uprights 56 carrying the subsurface tillers 55, revolving coulters 60 are provided mounted on axles 61 carried by brackets 62 secured to the uprights 56, the coulters 60 thus cutting through the sod and permitting the uprights to enter the sod.

The modification shown in Figs. 1 and 2 may be utilized to perform the following planting operations:

(I) The operation of planting through a stubble or trash mulch, by opening the furrow with the rolling coulter 17, widening the furrow by wheel 19, and then dropping in the seeds and covering them in the trench without utilizing the rotary tillers 33 or mowing attachments 38—39—40, or subsurface tillers 55.

(II) The operation of planting through a living cover crop and mulch by first mowing or cutting the growing cover crop using mowing attachments 38—39—40, leaving the cuttings on the ground as a mulch, also using rotary tillers 33 to pulverize the cover crop and mulch in a narrow strip (about six inches wide) directly in front of the planting mechanism as a seed bed. The rolling coulter 17 of the planter will cut through any trash remaining and start the furrow, the widening wheel 19 will open the furrow and give a firm bed for the seed which are dropped from the hoppers 24 and covered by discs 26—27. This completes the planting except for one or two mowings or cuttings of the cover crop between planted rows while the row crop is growing.

(III) The operation of planting through a dead cover crop and mulch by first mowing or cutting the growing cover crop by mowing units 38—39—40, leaving the cuttings on the ground as a mulch, also using rotary tillers 33 to pulverize the cover crop and mulch in a narrow strip (about six inches wide) directly in front of the planting mechanism as a seed bed; also by using subsurface tillers 55 to cut the roots of the cover crop between the pulverized seed beds, thus leaving a non-growing or dead mulch between the row crops. The rolling coulter 17 of the planter will cut through any trash remaining and start the furrow, the widening wheel 19 opening the furrow and giving a firm bed for the seed which are dropped and covered. This completes the planting as no further cultivation is necessary.

Figure 3:
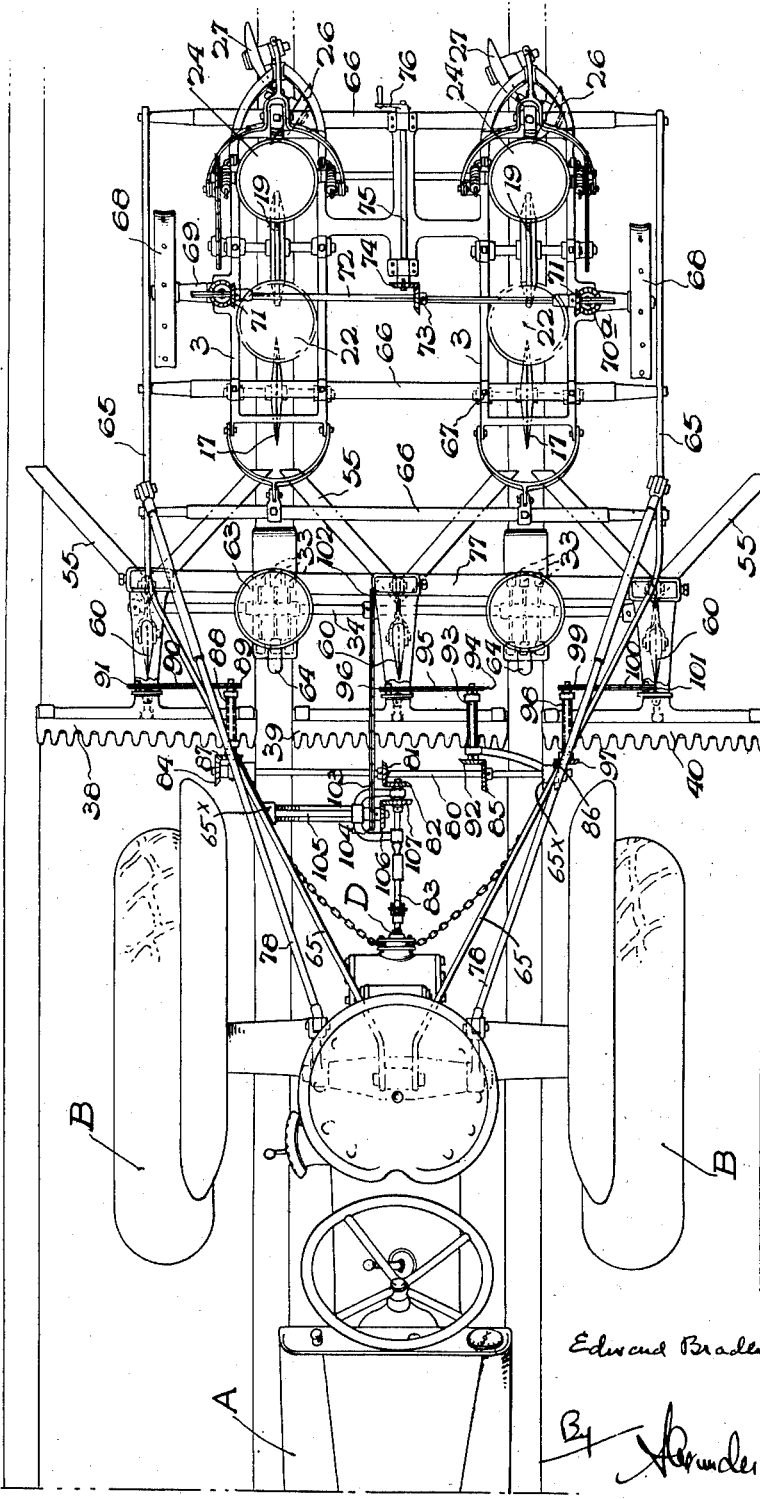
Fig. 3 is a top plan view of a modified arrangement.

Figs. 3, 4 and 7 show the planter drawn by tractor A rather than carried by it. In this modification, the planter frame consists of parallel side members 65 secured together by cross members 66 to form a substantially rectangular frame, the sub-frame units 3, which are formed generally in the same manner as described with reference to Figs. 1 and 2, being laterally adjustably mounted thereon by means of bolts 67 so as to vary the spacing between the rows. In this modification, the planter unit sub-frames 3 carried by the frame 65—66 is substantially identical with that previously described, each consisting of a coulter disc 17, a trench widening and deepening wheel 19, the concavo-convex discs 26—27 all being arranged one following the other and operating in the same manner as previously described. Also, the same fertilizer hoppers 22 and seed hoppers 24 may be provided as previously described.

In operation, each frame would normally be supported by the coulter disc 17 and wheel 19, the depth of penetration of members 17 and 19 being controlled by the adjustment of ground engaging wheels 68 which have hubs 69 (Fig. 7) journaled on sub axles carried by vertically slidable blocks 69a mounted on guides 69b at the sides of the frame members 65, in the manner described in my aforesaid copending applications. The blocks 69a have threaded bores for the reception of screw shafts 70 which are rotatably mounted but non-axially movable with respect to the guides 69b. The screw shafts 70 carry bevel gears 70a at their upper ends engaged by bevel gears 71 mounted on the ends of a shaft 72 which carries a bevel gear 73 intermediate its ends engaged by a bevel gear 74 on a shaft 75 journaled in suitable bearings on the frame 65—66, said shaft 75 having a hand crank 76 whereby as shaft 75 is rotated the ground wheels 68 will be correspondingly simultaneously raised or lowered, the setting of the wheel determining the penetration of the coulter discs 17 and the trench widening wheel 19 below the ground surface.

In this modification (Figs. 3 and 4), the forward ends of the side members 65 of the frame carry a cross-beam 77 similar to the cross-beam 41 shown in Figs. 1 and 2. Below the cross beam 41 are arranged the rotary tillers 33 similar to those previously described, the same being carried upon the shaft 34 which is rotated by the power takeoff shaft D of the tractor A, in the same manner hereinbefore described, so that the rotary tillers 33 rotate at a greater speed than the coulters 17 and have the same function as those previously described. Also, the cross-beam 77 carries by means of brackets 111a (Fig. 4) the three mowing mechanisms 38—39—40 which are similar in all respects to those described in connection with Figs. 1 and 2, and which are disposed between the rear wheels B of the tractor A and the rotary tillers 33.

The frame 65—66 is secured to the rear end of the tractor by means of the forward ends of members 65 and inclined links 78 which connect the forward corners of the frame 65—66 to the rear axle of the tractor. The forward ends of frame members 65 conveniently support or carry by straps 65x or the like the journals for the shaft which drives the rotary tillers 33 and the blades of the mowing mechanism 38—39—40 from the power take-off shaft D.

As shown, a shaft 80 has its ends journaled in bearings in the straps 65x and shaft 80 carries a bevel gear 81 meshing with a bevel gear 82 on an extension 83 of the power takeoff shaft D; which extension comprises the usual universal joints and telescoping shaft whereby vertical movement between frame 65—66 and the tractor may be accommodated. Shaft 80 also carries bevel gears 84—85—86. Bevel gear 84 drives the blade of the mowing mechanism 38 through a beveled gear 87 on a shaft 88 which carries a sprocket 89, chain 90 running around sprocket 89 and a sprocket 91 which operates the blade of mowing mechanism 38. Similarly, bevel gear 85 drives the blade of mowing mechanism 39 through a bevel gear 92 on a shaft 93 carrying a sprocket 94 around which runs a chain 95, which also runs over sprocket 96 of the drive for the blade of mowing mechanism 39. Bevel gear 86 drives the blade of the mowing mechanism 40 through a bevel gear 97 on shaft 98 carrying a sprocket 99 around which runs a chain 100, which chain also runs around the sprocket 101 which drives the blade of mowing mechanism 40.

The shaft 34 of the rotary tillers 33 is provided with a sprocket 102 around which runs a chain 103 also running around a sprocket 104 on a shaft 105 journaled on a strap 65x, shaft 105 also carrying a bevel gear 106 meshing with a bevel gear 107 on the extension shaft 83, above mentioned.

The operation of the unit shown in Figs. 3, 4 and 7 is the same as that previously described in connection with Figs. 1 and 2. If desired, additional fertilizer hoppers 63 may be disposed above the rotary tillers 33 with their spouts 64 discharging in advance of said tillers 33, for the reason previously stated. Also mounted upon the beam 77 are the subsurface tillers 55 having their coulters 60 arranged in the same manner as previously described, and serving the same purpose.

In the modification shown in Figs. 5 and 6, the planter is again carried by tractor A, as in Figs. 1 and 2; however, the parts are differently arranged. In this modification, the planting units 3 are mounted below the rear axle of tractor A and are raised and lowered with respect to the ground surface by means of the usual power lift arm L with which the tractor is equipped. As shown, the tractor A is provided with the power lift arm L (Fig. 6) raised or lowered by the operator through suitable conventional controls (not shown). The front end of each frame 3 is connected by toggle links 150—151 (Fig. 6) to the tractor A, while the rear portion of each frame 3 is connected by links 78 to the power lift arm L, whereby as the arm is raised or lowered, the frame 3 will be simultaneously raised or lowered in parallel relation to the ground surface.

As shown, each of the planting units consists of the frame 3 of the same type shown in Figs. 1 to 4, same carrying the coulter disc 17, the trench widening and deepening wheel 19, and the concavo-convex mulching discs 26—27, all arranged as previously described. The parallel units are separated by cross bars 110, and each of the units may carry a fertilizer hopper 22, and a seed hopper 24, arranged as previously described. The above arrangement of the planting units 3 is very compact, and by manipulating the arm L, the planting units may be simultaneously raised or lowered, or may be forcibly depressed against the ground surface to cause the coulter discs 17 to penetrate the ground surface to a desired depth.

A cross-beam 111 is secured to the under side of the tractor frame between the front and rear wheels, said cross-beam 111 carrying the mowing attachments 38—39—40 adjustably mounted thereon in the same manner described in connection with Figs. 1 to 4. Units 38—39—40 carry driving sprockets 38x—39x—40x respectively for reciprocating the respective blades, sprocket 38x being driven by a chain 112 running over said sprocket 38x and over a sprocket 113 carried by shaft 114 having a bevel gear 115 at its rear end engaging a bevel gear 116 on a transverse shaft 117, shaft 117 being driven by a shaft 118 through intermeshing bevel gears 119—120, shaft 118 having a sprocket 121 at its rear end over which runs a chain 122, which chain 122 also runs around a sprocket 123 on the power takeoff shaft D of the tractor.

The drive sprocket 39x for mowing attachment 39 is driven by a chain 125 which runs over a sprocket 126 on a shaft 127 which carries a bevel gear 128 meshing with a bevel gear 120 on shaft 117. The drive sprocket 40x of moving attachment 40 is driven by chain 129 which runs over a sprocket 130 on a shaft 131 which carries a bevel gear 132 meshing with a bevel gear 133 on the shaft 117. Thus the blades of each of the mowing attachments are driven from the power takeoff shaft D of the tractor.

Supported upon the cross-beam 111 are the sub-surface tillers 55 similar in all respects to those shown in Figs. 1 to 4, which tillers 55 are preceded by the coulter wheels 60, as in Figs. 1 to 4. Cross-beam 111 also supports the rotary tillers 33 which are identical in construction with those shown in Figs. 1 to 4, the same being driven by a shaft 136 driven from the power takeoff D by a sprocket 140 opposite a sprocket 141 on shaft 117, a chain 142 running around sprockets 140 and 141. Preferably auxiliary fertilizer hoppers 63 may be utilized with the rotary tillers 33 as previously explained in Figs. 1 to 4, the hoppers 63 having boots 64 discharging directly ahead or in advance of the rotary tillers 33.

The operation of the modification shown in Figs. 5 and 6 is the same as previously described in connection with Figs. 1-4 inclusive.

I do not limit my invention to the exact forms shown in the drawings, for obviously changes may be made therein within the scope of the claims.

I claim:

1. Apparatus for planting crops in a living cover crop without turning the same, comprising a frame adapted to be moved over the living cover crop; means on the frame for mowing parallel closely adjacent strips in the living cover crop; means on the frame for pulverizing the relatively narrow portion of the living crop between said parallel strips; and means on the frame in rear of the pulverizing means for planting seed in the pulverized portion, the living cover crop and the overlying mowed living crop in the strips at opposite sides of the pulverized portion minimizing soil erosion.

2. In apparatus as set forth in claim 1, said planting means including trench opening means, trench widening and compressing means, seed feeding means, and mulching means.

3. In apparatus as set forth in claim 1; said pulverizing means comprising a rotary tiller on the frame; and means for rotating the tiller at a higher speed than the speed of the frame moving over the living cover crop.

4. In apparatus as set forth in claim 1, means on the frame for discharging fertilizer in advance of the pulverizing means.

5. Apparatus for planting crops in a living cover crop without turning the same, comprising a frame adapted to be moved over the living cover crop; means on the frame for mowing parallel closely adjacent strips in the living cover crop; means on the frame for pulverizing the relatively narrow portion of the living cover crop between said parallel strips; means on the frame in rear of the pulverizing means for planting seed in the pulverized portion; and means on the frame for the sub-surface cutting of the roots of the living cover crop through the width of said parallel strips, thereby providing a dead mulch in the parallel strips at opposite sides of the pulverized portion which with the mowed living cover crop overlying said parallel strips will minimize soil erosion.

6. In apparatus as set forth in claim 5, said planting means including trench opening means, trench widening and compressing means, seed feeding means, and mulching means.

7. In apparatus as set forth in claim 5; said pulverizing means comprising a rotary tiller on the frame; and means for rotating the tiller at a higher speed than the speed of the frame moving over the living cover crop.

8. In apparatus as set forth in claim 5, means on the frame for discharging fertilizer in advance of the pulverizing means.

9. Apparatus for planting crops in a living cover crop without turning the same, comprising a frame adapted to be moved over the living cover crop; means on the frame for pulverizing a relatively narrow strip in the living cover crop; and means on the frame in rear of the pulverizing means for planting seed in the pulverized strip of the living cover crop, said pulverizing means comprising a rotary tiller on the frame; and means for rotating the tiller at a higher speed than the speed of the frame moving over the living cover crop, the living cover crop at opposite sides of the pulverized strip minimizing soil erosion.

10. In apparatus as set forth in claim 9, said planting means including trench opening means, trench widening and compressing means, seed feeding means, and mulching means.

11. In apparatus as set forth in claim 9, means in the frame for discharging fertilizer in advance of the pulverizing means.

12. Apparatus for planting crops in a living cover crop without turning the same, comprising a frame adapted to be moved over the living cover crop; means on the frame for pulverizing a relatively narrow strip in the living cover crop; means on the frame in rear of the pulverizing means for planting seed in the pulverized strip of the living cover crop; and means on the frame for the sub-surface cutting of the roots of the living cover crop at opposite sides of said strip, thereby providing a dead mulch at opposite sides of the pulverized strip to minimize soil erosion.

13. In apparatus as set forth in claim 12, said planting means including trench opening means, trench widening and compressing means, seed feeding means, and mulching means.

14. In apparatus as set forth in claim 12, said pulverizing means comprising a rotary tiller on the frame; and means for rotating the tiller at a higher speed than the speed of the frame moving over the living cover crop.

15. In apparatus as set forth in claim 12, means in the frame for discharging fertilizer in advance of the pulverizing means.

EDWARD BRADLEY DEWEY.

REFERENCES CITED

The following references are of record in the file of this patent:

UNITED STATES PATENTS

| Number | Name | Date |
|---|---|---|
| 49,104 | Hall | Aug. 1, 1865 |
| 107,218 | Bourne | Sept. 13, 1870 |
| 219,116 | Sackett | Sept. 2, 1879 |
| 289,694 | Nelson | Dec. 4, 1883 |
| 298,880 | Newton | May 20, 1884 |
| 376,089 | Harter | Jan. 10, 1888 |
| 633,267 | Jensen et al. | Sept. 19, 1899 |
| 884,814 | Gordon et al. | Apr. 14, 1908 |
| 951,522 | Brown | Mar. 8, 1910 |
| 1,016,586 | Sulliger | Feb. 12, 1912 |
| 1,074,217 | Shafer | Sept. 30, 1913 |
| 1,171,010 | Von Meyenburg | Feb. 8, 1916 |
| 1,251,945 | Wagner | Jan. 1, 1918 |
| 1,279,060 | Wilder | Sept. 17, 1918 |
| 1,292,391 | Dougherty | Jan. 21, 1919 |
| 1,314,838 | Wagner | Sept. 2, 1919 |
| 1,328,375 | Griffice | Jan. 20, 1920 |
| 1,349,858 | Sherrod | Aug. 17, 1920 |
| 1,402,822 | Wolff | Jan. 10, 1922 |
| 1,512,596 | Hamshaw | Oct. 21, 1924 |
| 1,897,355 | Altgelt | Feb. 14, 1933 |
| 1,918,950 | Altgelt | July 18, 1933 |
| 2,355,393 | Powers | Aug. 8, 1944 |

FOREIGN PATENTS

| Number | Country | Date |
|---|---|---|
| 3,772 | Austria | Apr. 10, 1901 |

OTHER REFERENCES

U. S. Department of Agriculture Farmer's Bulletin No. 1997, June 1948.